(12) United States Patent
Nuding et al.

(10) Patent No.: US 8,141,369 B2
(45) Date of Patent: *Mar. 27, 2012

(54) METHOD OF REGULATION OF THE TEMPERATURE OF HOT GAS OF A GAS TURBINE

(75) Inventors: Joachim-Rene Nuding, Ratingen (DE); Christoph Pels Leusden, Mülheim an der Ruhr (DE); Marco Tappen, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 446 days.

This patent is subject to a terminal disclaimer.

(21) Appl. No.: 12/393,276

(22) Filed: Feb. 26, 2009

(65) Prior Publication Data

US 2009/0158746 A1   Jun. 25, 2009

Related U.S. Application Data

(63) Continuation of application No. 10/550,972, filed as application No. PCT/EP2004/003184 on Mar. 25, 2004, now Pat. No. 7,513,099.

(30) Foreign Application Priority Data

Mar. 28, 2003 (DE) .................................. 103 14 389
Sep. 30, 2003 (EP) .................................. 03022209

(51) Int. Cl.
 *F02C 3/30* (2006.01)
(52) U.S. Cl. ............................. 60/775; 60/39.3; 60/39.53
(58) Field of Classification Search ............... 60/39.281, 60/39.3, 39.53, 39.59, 728, 775
See application file for complete search history.

(56) References Cited

U.S. PATENT DOCUMENTS

| 6,256,976 B1 | 7/2001 | Kataoka et al. |
| 6,260,350 B1 | 7/2001 | Horii et al. |
| 6,357,236 B1 | 3/2002 | Utamura |
| 7,513,099 B2 * | 4/2009 | Nuding et al. ............. 60/39.281 |
| 2002/0083712 A1 | 7/2002 | Tomlinson et al. |

FOREIGN PATENT DOCUMENTS

| EP | 1 203 866 A2 | 5/2002 |
| EP | 1 231 369 A2 | 8/2002 |
| JP | 2001041049 A1 | 2/2001 |

* cited by examiner

*Primary Examiner* — Louis Casaregola

(57) ABSTRACT

The invention relates to a method of regulation of the temperature of a hot gas of a gas turbine, particularly of a stationary gas turbine used for generating electricity, which comprises injecting a liquid into an airflow, which can be drawn into a compressor and with the aid of which a fuel inside a combustion chamber, which is situated downstream, combusts while producing the hot gas that is subsequently expanded when flowing through the turbine part located downstream. A temperature measuring device is provided that measures the temperature of the airflow before the compressor, whereby the temperature of the hot gas is regulated by the quantity of fuel. The aim of the invention is to provide a regulation with which, during wet compression operation, the serviceable life of the components subjected to the action of hot gas is lengthened. To this end, the invention provides that the temperature measuring device is mounted before the injecting device, and that the temperature of the airflow is calculated at the entry of the compressor by using the measured temperature.

7 Claims, 2 Drawing Sheets

METHOD OF REGULATION OF THE TEMPERATURE OF HOT GAS OF A GAS TURBINE

CROSS REFERENCE TO RELATED APPLICATION

This application is a continuation of U.S. application Ser. No. 10/550,972, filed Sep. 26, 2005, now U.S. Pat. No. 7,513,099 which is the US National Stage application of International Application No. PCT/EP2004/003184 filed Mar. 25, 2004 and claims the benefit thereof. The International Application claims the benefits of German Patent application No. 10314389.0 DE filed Mar. 28, 2003, and European Patent application No. 03022209.5 EP filed Sep. 30, 2003, all of the applications are incorporated by reference herein in their entirety.

FIELD OF THE INVENTION

The invention relates to a method of regulation of a gas turbine, in particular a stationary gas turbine for power generation, in accordance with the preamble of the claims.

BACKGROUND OF THE INVENTION

It is known that stationary gas turbines are used to generate mechanical energy, which a generator generally converts into electrical energy. For this purpose, a fossil fuel is burnt in the gas turbine with an air stream that has been compressed by the compressor, to form a hot gas which then expands so as to perform work at the rotor in a turbine. The gas turbine is operated in such a way that sufficient energy is output at the rotor shaft to generate the electrical energy, while a maximum temperature of the hot gas at the turbine inlet should not be exceeded.

The turbine inlet temperature cannot be measured directly, on account of its high values. Therefore, the temperature of the exhaust gas which is present at the turbine outlet is recorded, and the turbine inlet temperature can then be determined by calculation from this turbine outlet temperature. The turbine outlet temperature and therefore indirectly also the turbine inlet temperature can be controlled by means of the quantity of fuel introduced into the combustion chamber, while these temperatures are also dependent on the temperature of the air at the compressor inlet. To simplify control of the gas turbine, an auxiliary variable is calculated by means of a mathematical model, eliminating the dependency of the turbine outlet temperature on the compressor inlet temperature. This auxiliary variable is used as a corrected turbine outlet temperature. It is dependent only on the quantity of fuel consumed, resulting in simple control of the gas turbine. Although the control is also dependent on the mains frequency of the power generated by the generator, this influence is not taken into account here.

To increase the performance of the gas turbine, it is also possible for water to be fed to the air stream sucked in by the compressor even before it has been compressed, in order to increase the mass flow through the gas turbine. This is generally known as wet compression mode.

The temperature of the air which is sucked in generally differs from the temperature of the liquid which is injected. Since the temperature-measuring devices arranged at the inlet of the compressor for measuring the air temperatures are wetted by the liquid that has been introduced, the temperature-measuring devices are not recording the temperature of the air, but rather that of the liquid.

If, on account of a compressor inlet temperature which is clearly higher following the measurement, a lower turbine outlet temperature is determined than the turbine outlet temperature which is actually present, the controller of the gas turbine increases the supply of fuel into the combustion chamber in order to compensate for the presumed difference. However, this leads to overfiring of the gas turbine, i.e. the actual turbine inlet temperature may become higher than the maximum permissible turbine inlet temperature. The gas turbine is underfired if the compressor inlet temperature measured is lower than the actual turbine inlet temperature.

Overfiring of the gas turbine can lead to overheating of the components exposed to hot gas and therefore to a reduction in their service life, or even to defects. On the other hand underfiring of the gas turbine leads to loss of performance.

SUMMARY OF THE INVENTION

The object of the invention is to provide a gas turbine in which the service life of the components exposed to hot gas is increased in wet compression mode yet nevertheless the maximum power output is achieved. A further object of the invention is to provide a control arrangement which implements operation of this type. A further object of the invention is to provide a corresponding temperature-measuring device.

The object relating to the gas turbine is achieved by the features of the claims. Advantageous configurations are given in the subclaims.

The solution provides for the temperature-measuring device to be arranged upstream of the injection apparatus, as seen in the direction of flow of the air, and for the temperature of the air stream at the compressor inlet to be calculated by means of the measured air temperature. Therefore, the liquid which is introduced cannot wet the temperature-measuring devices, which means that it is always the temperature of the air stream that is sucked in which is measured. Simply protecting the temperature-measuring devices by means of protective tubes does not eliminate the problem, since in this case the temperature-measuring devices would measure the temperature of the protective tubes, and these tubes would in turn be wetted with the liquid.

In an advantageous refinement, the humidity of the air stream can be determined by means of air-humidity-measuring devices upstream of the injection apparatus. If the air humidity and air temperature of the air stream that is sucked in are known, it is possible to determine the evaporation of the liquid which is introduced on its way to the compressor inlet. By taking the air humidity into account, it is possible for the temperature at the inlet of the compressor to be calculated particularly accurately.

If the temperature of the air stream at the compressor inlet is calculated by means of a function based on air temperature and humidity distributions, this calculation is particularly simple.

In an advantageous refinement, the air temperature and humidity distributions can be predetermined in the form of diagrams, so that it is particularly simple to portray the dependency of the evaporation of the injected liquid in the air stream. This contributes to simple calculation.

The object relating to the temperature-measuring device is achieved by the features of the claims. The advantages of the temperature-measuring device suitably correspond to those of the gas turbine.

The object relating to the control arrangement is achieved by the features of the claims. Advantageous configurations are given in the subclaims.

The solution provides for the temperature-measuring device to be arranged upstream of the injection apparatus and for the air temperature of the air stream at the inlet of the compressor to be calculated by means of the measured temperature. The advantages of the control arrangement suitably correspond to those of the gas turbine.

In an advantageous configuration of the control arrangement, with 100% evaporation a minimum possible temperature is determined and used as replacement for the temperature at the inlet of the compressor. In this context, it is assumed that the liquid introduced by the injection apparatus evaporates sufficiently for a relative air humidity of 100% to be established at the compressor inlet. Working on the basis of this assumption, it is possible, in conjunction with the measured air humidity and air temperature, to determine the minimum feasible (lowest possible) temperature at the compressor inlet. If the minimum possible temperature is now used as the temperature for the air stream at the compressor inlet, the temperature which actually prevails at the compressor inlet is always greater than the minimum possible temperature, since an air humidity of 100% is never achieved without external action. In this situation, the gas turbine is always underfired. Overheating of the components exposed to hot gas is therefore avoided, so that the service life of the components is not reduced.

An improved control arrangement for the gas turbine ensues if the temperature of the air stream at the inlet of the compressor is calculated taking account of the actual evaporation of the injected liquid in the air stream. The efficiency of the evaporation is determined by calculations and/or tests, and this efficiency, with the aid of the minimum possible temperature, is used to determine the air temperature which is present at the compressor inlet. With this control arrangement, it is possible to reproduce the true conditions with regard to evaporation of the introduced liquid on the way to the compressor inlet, and thereby to bring about reliable and more high-performance operation of the gas turbine, avoiding both overfiring and underfiring of the gas turbine.

In a preferred configuration of the control arrangement, the quantity of liquid injected into the air stream is altered as a function of the evaporation. The compressors of gas turbines are usually dimensioned for a predetermined quantity of liquid which evaporates during the compression. However, the evaporation causes a small proportion of the injected liquid to evaporate even before the compression, which means that the compressor is not operated in the optimum range. This drawback can be avoided by adapting the quantity of liquid injected.

The efficiency of the evaporation, which is substantially dependent on the droplet characteristics and the geometry, i.e. the spatial arrangement of the components of a compressor, can be estimated from tests and/or determined from calculations, which are then stored in the form of models or formulae in the controller. The avoidance of underfiring increases the power output of the gas turbine, and the prevention of overfiring of the gas turbine means that the service life of the components which guide hot gas is not adversely affected.

The advantages of the control arrangement suitably correspond to the advantages of the gas turbine.

BRIEF DESCRIPTION OF THE DRAWINGS

The invention is explained with reference to a drawing, in which.

DETAILED DESCRIPTION OF THE INVENTION

Figure 1:
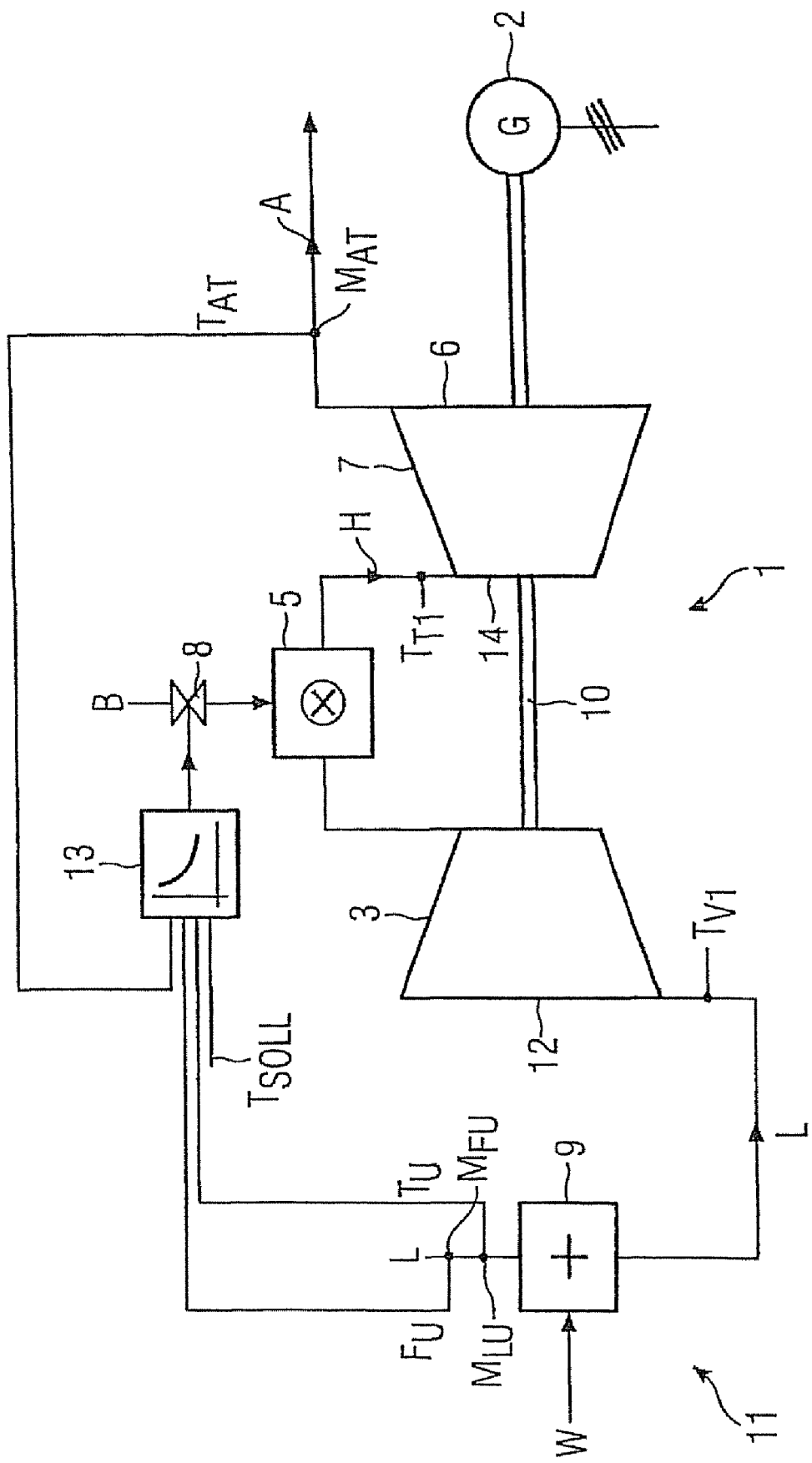
FIG. 1 shows a gas turbine installation.

FIG. 1 diagrammatically depicts a gas turbine installation for converting fossil energy into electrical energy by means of a gas turbine 1 and a generator 2 coupled to it. The stationary gas turbine 1 substantially comprises a compressor 3, a combustion chamber 5 and a turbine part 7. The compressor 3 is connected to the turbine part 7 and the generator 2 via a common rotor shaft 10.

When the gas turbine 1 is operating, the compressor 3 sucks in air through an intake housing 11 and compresses it. The compressed air is mixed with a fuel B, which can be supplied through a shut-off member 8, in a burner and fed to the combustion chamber 5. In operation, the mixture burns to form a hot gas H which then flows into the turbine part 7, where the hot gas H expands and in so doing drives the rotor shaft 10. Then, the hot gas H leaves the gas turbine 1 as exhaust gas A, passing into an exhaust conduit (not shown in more detail). The rotor shaft 10 drives the compressor 3 and the generator 2.

To control operation of the gas turbine 1, the temperature $T_{AT}$ of the hot gas H at the outlet 6 of the turbine part 7 is monitored by means of a temperature-measuring device $M_{AT}$, since the Temperature $T_{T1}$ of the hot gas H which is present at the inlet 14 of the turbine part 7 cannot be measured. Both the power of the gas turbine 1 and the turbine outlet temperature $T_{AT}$, and therefore indirectly also the turbine inlet temperature $T_{T1}$, can be controlled by the quantity of fuel B introduced into the combustion chamber 5. An increase in the volumetric flow of the fuel B into the gas turbine 1 leads to a higher temperature of the hot gas H and to an increase in the power of the gas turbine 1. For this purpose, the controller 13 controls the shut-off member 8, which it actuates via its outlet.

Since the turbine inlet temperature $T_{T1}$ is also dependent on the temperature $T_{V1}$ of the air stream L which is sucked in upstream of the compressor 3, this temperature is likewise recorded or determined constantly, i.e. at recurring intervals throughout the entire duration of operation.

The controller 13 eliminates the dependency of the turbine outlet temperature $T_{AT}$ on the air temperature $T_{V1}$ by determining a corrected turbine outlet temperature $T_{ATK}$ as auxiliary variable in accordance with the following equation 1. $T_{ATK} = T_{AK} - k_1 \cdot T_{V1}$ \hfill (1).

Accordingly, the corrected turbine outlet temperature $T_{ATK}$ is dependent only on the fuel B which is introduced, so that the gas turbine 1 can be controlled more easily by controlling the corrected turbine outlet temperature $T_{ATK}$ as a control variable and setting the volumetric flow of the fuel B as manipulated variable. The corrected turbine outlet temperature $T_{ATK}$ could also be determined on the basis of a quadratic equation or on the basis of other functions.

The controller 13 has an input, at which the desired value $T_{Soll}$ of the corrected turbine outlet temperature can be set. In the controller 13, the desired value $T_{Soll}$ is compared with the determined corrected turbine outlet temperature $T_{ATK}$. If the actual value, the corrected turbine outlet temperature $T_{ATK}$ is lower—higher—than the desired value $T_{Soll}$, the controller 13 uses the shut-off member 8 to increase—reduce—the supply of fuel.

If the gas turbine 1 is operated without a liquid being introduced into the air stream L, the temperature-measuring device $M_{LU}$ arranged upstream of the intake housing 11 can measure the temperature $T_{V1}$ of the air stream at the compressor inlet 12 directly.

Figure 2:
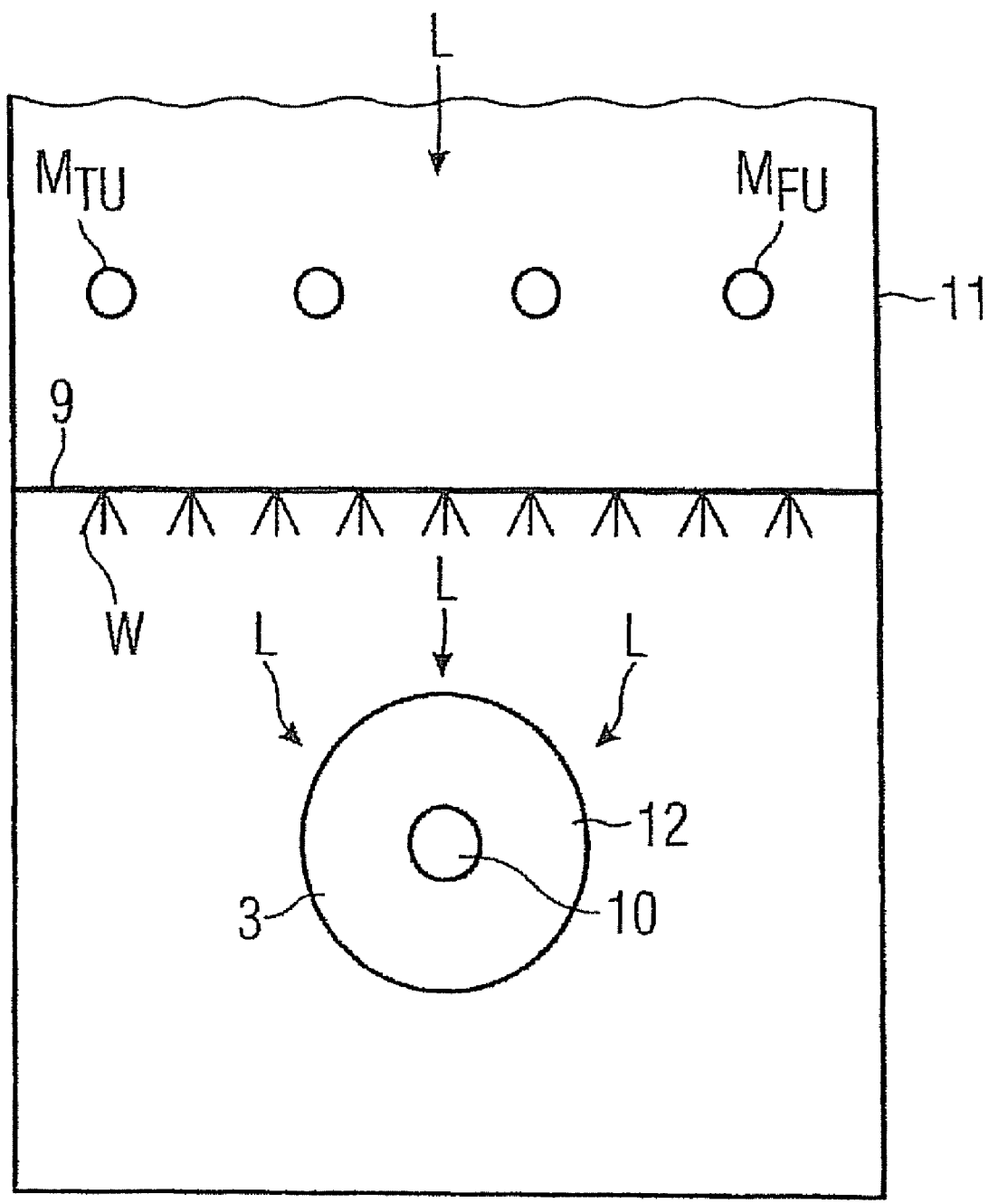
FIG. 2 shows an intake housing of a gas turbine as shown in FIG. 1.

FIG. 2 shows the intake housing 11 of the gas turbine 1. The temperature-measuring devices $M_{TU}$ are arranged above an injection apparatus 9, so that the liquid W which is introduced does not wet the temperature-measuring devices $M_{TU}$ and the air-humidity-measuring devices $M_{FU}$.

In wet compression mode, a liquid W, in particular water, is injected into the air stream L sucked in in the intake housing 11 via the injection apparatus 9.

The temperature $T_U$ of the air which is sucked in is determined upstream of the intake housing 11 by means of the temperature-measuring devices $M_{LU}$, and the air humidity $F_U$ of this air is determined upstream of the intake housing 11 by means of the air-humidity-measuring devices $M_{FU}$. The outputs of these measuring devices are connected to the inputs of the controller 13.

The temperature $T_{V1}$ which is present at the inlet 12 of the compressor 3 and is required for control is determined as a function of the measured values and on the basis of models in the controller 13. Therefore, the gas turbine 1 can be controlled by controlling the turbine outlet temperature $T_{ATK}$ by means of the quantity of fuel B injected using equation (1).

If it is intended for the gas turbine 1 to be operated with injection of a liquid W into the air stream L sucked in by the compressor 3, two different control arrangements are possible: control with a theoretical evaporation which leads to an assumed air humidity of 100%, and adapted control with variable evaporation.

In the case of the control with the theoretical evaporation, it is assumed that enough of the injected liquid has evaporated for the air humidity in the intake air stream L at the compressor inlet 12 to be 100%. On this assumption, a minimum feasible temperature $T_{WetBulb}$, which replaces the temperature $T_{V1}$ at the compressor inlet 12, is determined on the basis of the measured temperature $T_U$ and air humidity $F_U$ of the air stream L. The compressor inlet temperature $T_{V1}$ determined in this way can be ascertained by calculation or also from diagrams which are reproduced in electronic form in measurement technology, or also by means of mathematical formulae. The equation for the controller 13 for determining the corrected turbine outlet temperature $T_{ATK}$ is then as follows:

1. $T_{ATK} = T_{AK} - k_1 \cdot T_{WetBulb}$ (2).

Since an air humidity of 100% is never achieved in real operation, the actual temperature $T_{V1}$ at the inlet 12 of the compressor 3 is always greater than the assumed minimum feasible temperature. The use of the minimum feasible compressor inlet temperature $T_{WetBulb}$ in each case determines an excessively high corrected turbine outlet temperature $T_{ATK}$, so that the controller 13 always provides an insufficient quantity of fuel B to the burner. This prevents overfiring of the gas turbine 1. Accordingly, the components of the gas turbine 1 which are exposed to hot gas, such as turbine blades and vanes, guide rings, platforms and combustion chamber heat shields, are exposed to the appropriate temperatures and premature fatigue is prevented in these components.

In the case of the adapted control of the gas turbine 1, an air humidity which is present at the inlet 12 of the compressor 3 is determined, although this air humidity is lower than 100% and can be determined as a function of the measured air humidity $F_U$, the measured temperature $T_U$ of the air stream L and the quantity of liquid W introduced by the injection apparatus 9. The efficiency η of the evaporation of the liquid W in the intake air stream L is also taken into account in this calculation in order to determine the temperature $T_{V1}$ at the inlet 12 of the compressor 3.

The efficiency of saturation of the air stream L with a liquid W can be calculated according to $$\eta = \frac{T_U - T_{V1}}{T_U - T_{WetBulb}}. \quad (3)$$

Resolving equation (3) with respect to $T_{V1}$ and then inserting it into equation (1) gives:

1. $T_{ATK} = T_{AT} - k_1 \cdot [T_u - \eta \cdot (T_U - T_{WetBulb})]$ (4).

The efficiency η of the evaporation, which is dependent on the droplet characteristics of the injected water and on the geometry, i.e. the spatial arrangement of the components of the compressor 3, can be determined by calculation and/or by tests and is then stored on the basis of a model or a diagram in electronic form in the controller 13.

Evaporation of the liquid W which leads to an air humidity at the inlet 12 of the compressor 3 which is lower than 100% gives a better description of the real conditions, resulting in improved control of the gas turbine 1.

A corrected turbine outlet temperature ($T_{ATK}$) determined in accordance with equation (4) is lower than a corrected turbine outlet temperature $T_{ATK}$ determined on the basis of equation (2), so that power losses resulting from the turbine inlet temperature $T_{T1}$ being assumed to be too low are avoided.

Furthermore, it is possible to determine the quantity of liquid W which evaporates before it reaches the inlet 12 into the compressor 3, and this quantity is then additionally injected by the injection apparatus 1. This leads to a further increase in the power of the gas turbine 1, since only the proportion of the liquid (W) which evaporates during the compression—i.e. in the compressor 3—contributes to increasing the power of the gas turbine 1 by wet compression.

The invention claimed is:

1. A method of controlling a hot-gas temperature of a hot gas in a stationary gas turbine, comprising:
    measuring a first temperature of an intake air upstream of a compressor of a gas turbine via a first temperature-measuring device;
    measuring the hot gas temperature at a turbine part outlet using a second temperature-measuring device;
    injecting a liquid into the intake air stream, wherein the liquid is injected into the intake air downstream of the first temperature-measuring device and upstream of an inlet to the compressor of the gas turbine;
    determining a humidity of the intake air upstream of the liquid injection via an air humidity device;
    compressing the intake air and injected liquid to form a compressed air stream;
    injecting a fuel into the compressed air stream;
    combusting the fuel and compressed air stream in a combustion chamber arranged downstream from the compressor to produce a hot gas that expands as it flows through a downstream turbine part;
    controlling the hot-gas temperature by a quantity of the fuel delivered, the controlling comprising:
    determining a second temperature of the air stream at the inlet of the compressor,
    determining a corrected hot gas temperature as a function of the second temperature, comparing the determined corrected hot gas temperature to an inputted desired value of hot gas temperature, and producing an output effective to control a shut-off member as a function of the compared corrected outlet temperatures, wherein the shut-off member controls the quantity of fuel delivered.

2. The method as claimed in claim 1, wherein the second temperature is calculated assuming a minimum possible temperature at which there is sufficient evaporation for a 100% air humidity to be present at the inlet of the compressor.

3. The method as claimed in claim 1, wherein the second temperature is calculated taking into account the evaporation of the injected liquid in the air stream.

4. The method as claimed in claim 1, wherein the quantity of liquid injected into the air stream is altered as a function of the evaporation.

5. The method as claimed in claim 1, wherein the liquid is distilled water.

6. The method as claimed in claim 1, wherein the second temperature is calculated by a function on the basis of temperature and humidity distributions.

7. The method as claimed in claim 6, wherein the function is predetermined in the form of diagrams.

* * * * *